(No Model.) 2 Sheets—Sheet 1.

N. W. HARTWELL.
COIN RELEASED HEIGHT MEASURING MACHINE.

No. 387,717. Patented Aug. 14, 1888.

WITNESSES:
Ch. Raeder,
Thos. E. Robertson,

INVENTOR,
Newton W. Hartwell,
BY J. W. Robertson,
ATTORNEY.

(No Model.) 2 Sheets—Sheet 2.
N. W. HARTWELL.
COIN RELEASED HEIGHT MEASURING MACHINE.
No. 387,717. Patented Aug. 14, 1888.
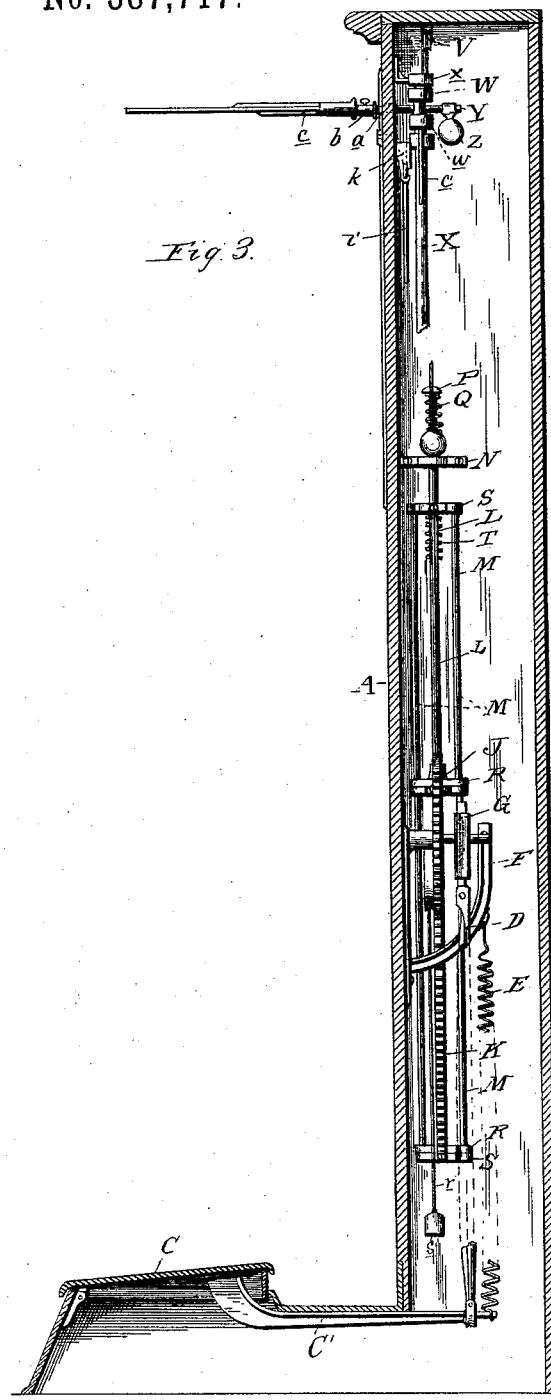
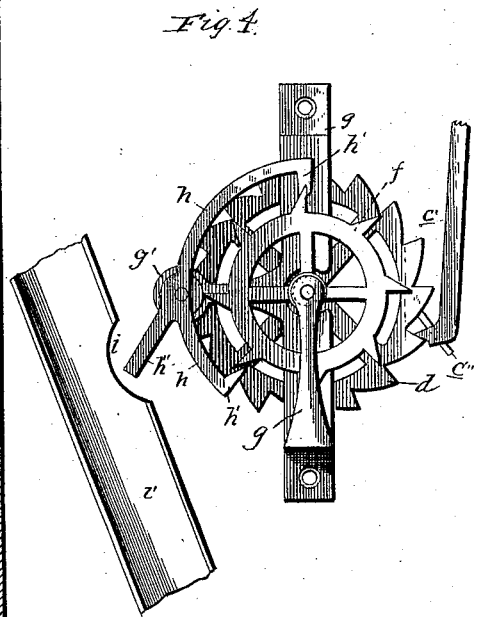
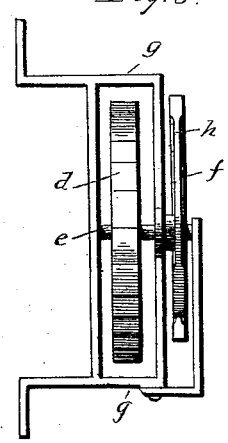
WITNESSES:
Thos. E. Robertson.
INVENTOR,
Newton W. Hartwell,
BY T. J. W. Robertson.
ATTORNEY.

UNITED STATES PATENT OFFICE.

NEWTON W. HARTWELL, OF LOUISVILLE, KENTUCKY.

COIN-RELEASED HEIGHT-MEASURING MACHINE.

SPECIFICATION forming part of Letters Patent No. 387,717, dated August 14, 1888.

Application filed April 2, 1888. Serial No. 269,242. (No model.)

*To all whom it may concern:*

Be it known that I, NEWTON W. HARTWELL, a citizen of the United States, residing at Louisville, in the county of Jefferson and State of Kentucky, have invented certain new and useful Improvements in Automatic Measuring Apparatus, of which the following is a specification, reference being had therein to the accompanying drawings.

This improvement relates to a measuring apparatus designed to automatically indicate the height of anything standing on the platform of the machine, but is more especially designed to indicate the height of human beings; and the invention consists in the peculiar construction, arrangement, and combinations of parts more particularly hereinafter described, and then definitely pointed out in the claims.

Figure 1:
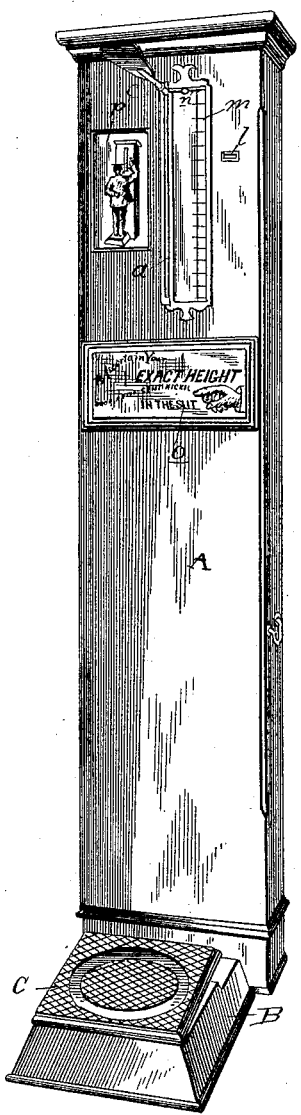
Figure 2:
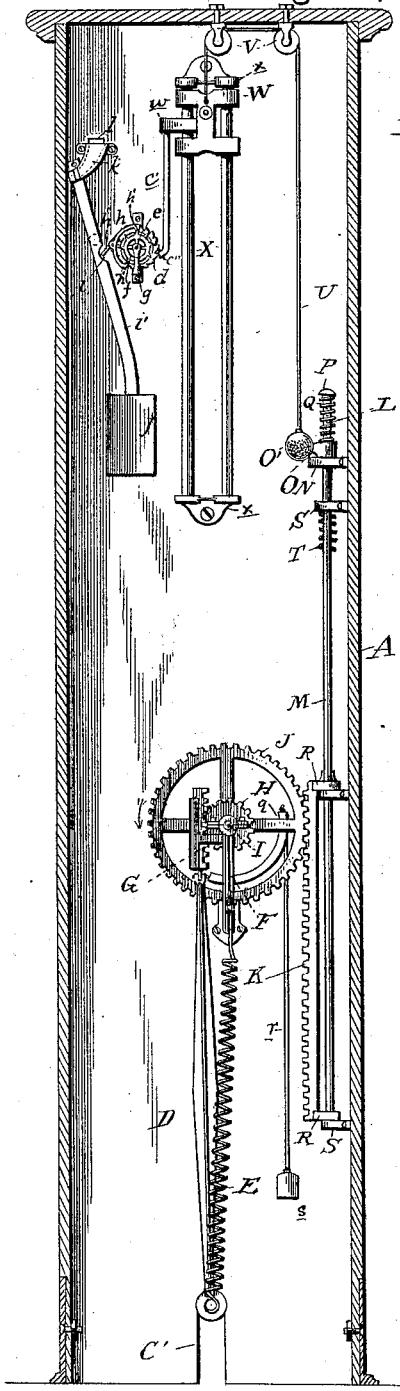

In the accompanying drawings, which show one way of carrying out my invention, Figure 1 is a perspective view of my apparatus; Fig. 2, a rear view with the back of the case removed. Fig. 3 is a side view with the side of the case removed; and Figs. 4 and 5 are details, on a larger scale, showing back and side views, respectively, of the device which locks the indicator in its normal position until a coin has been inserted in a slit in the case.

Referring now to the details of the drawings, A represents the case or cabinet containing most of the mechanism, and having an extension, B, at the foot, on the upper part of which extension is pivoted a platform or treadle, C, having an arm, C', which is connected to a vertical rod, D, and a spring, E, the latter having its upper end attached to a bracket, F; but it may be connected to any fixed part of the mechanism or the case.

The rod D carries at its upper end a short rack, G, which meshes with a pinion, H, that is fast on a shaft, I, journaled in the bracket F, and carrying a gear, J, that meshes with a long rack, K, connected to a rod, L, working on guides M, and passing through a bracket, N, and a projection, O, on the hollow adjustable weight O'. At the top of the rod L is fastened a washer, P, which acts as one of the points of resistance of a spring, Q, resting on the top of the projection O of the weight O'. This weight is designed to contain shot, as shown, the quantity of which may be varied as occasion may require to regulate the pressure on the escapement.

The top and bottom of the rack K are provided with cross-heads R, that slide on the guides M, and the latter are held in brackets S S. Between the upper bracket, S, and upper cross-head, R, is a spiral spring, T, which acts as a buffer when the cross-head R rises far enough to strike it, thus preventing noise and the jarring of the mechanism.

Connected to the top of the weight O' is one end of a chain or cord, U, which passes over pulleys V, and has its other end connected to a cross-head, W, sliding on guides X, supported by brackets *x* screwed to the case A. The cross-head W carries a rod, Y, one end of which supports a hollow adjustable weight, Z, and its other end protrudes through a slot, *a*, in the case, to receive a follower or gage consisting of a metal socket, *b*, by which it is secured to the rod, and a flat wooden piece, *c*, of the shape shown, although the shape of this may be varied to some extent to suit the maker.

Extending from the cross-head W is an arm, *w*, carrying a rod, *c'*, having a projection and pin, *c''*, at its lower end, that act on the teeth of a ratchet-wheel, *d*, (see Figs. 4 and 5,) which is firmly mounted on a shaft, *e*, carrying an escapement-wheel, *f*, which shaft is journaled in a frame, *g*, secured to the case A, and carries an arm, *g'*, on which is mounted an anchor, *h*, having pallets *h'*, and an arm, *h''*, which latter normally projects through an opening, *i*, in a tube, *i'*, whose lower end terminates in a money-box, *j*, and whose upper end communicates with the lower end of a curved passage, *k*, whose top is in line with an opening, *l*, through the case.

On the outside of the front of the case, at the side of the slot *a*, is a scale, *m*, showing feet, inches, and fractions of an inch, and attached to the rod Y is a pointer, *n*, that as it moves down the scale indicates the height of the individual being measured.

I prefer to put an inscription on the front, as at *o*, giving directions how to ascertain the weight, and also a photographic or other picture at *p*, illustrating the same. These last-mentioned features, however, are not essential, as the apparatus will work just as well without them.

The operation is as follows: The person to be measured stands upon the treadle C, thereby depressing arm C' and pulling rod D and short rack G downward, which rotates the pinion H and the gear-wheel J in the direction shown by the arrow, and thus raises the long rack K and rod L, leaving the weight O' free to rise, so far as the rod L is concerned. It will not, however, ascend until a coin is put into the slit $l$, which coin as it descends through the tube $i'$ strikes the arm $h''$, which moves the escapement and causes the pallets $h'$ to liberate the escape-wheel $f$, which will now turn, allowing the ratchet-wheel to turn also, and thus the cross-head W descends, carrying with it the gage or follower until the latter rests on the head of the person standing on the apparatus, when, of course, it will stop and the pointer will indicate the height of the person being measured. As soon as the person steps off of the treadle the spring E pulls up the arm C', and through the rod D, short rack G, pinion H, wheel J, long rack K, rod L, and cord or chain U, draws up the cross-head, gage, pointer, and the rod $c'$ until the pin $c''$ touches the back of one of the teeth on the ratchet-wheel, and thus forces it backward until the upper pallet, $h'$, drops on one of the teeth of the escape wheel and the hook of the rod $c'$ rests on the tooth of the ratchet-wheel below that operated on by the pin $c''$, when the apparatus is ready for measuring another person, but will not indicate the height until another coin is put in the slit, when the above operation will be repeated.

The tube $i'$ should be of the necessary size to allow the coin to freely travel down the same, and yet small enough to prevent its passing the arm $h''$ without operating the escapement.

I make the weights O' and Z hollow and adjust them to their duty by putting in more or less shot. This is important, as otherwise the escapement would not operate properly. If the weight Z were too heavy, the coin would not operate the escapement, and if it were too light a metal disk or coin of less weight than the proper coin might operate the escapement.

I have shown at $q$ a section of a sheave attached at the wheel J, from which depends a cord, $r$, and weight $s$, which will assist the spring E, although I do not consider this essential, as the spring may be made sufficiently strong for the purpose. The spring itself may be dispensed with by making the weight $s$ sufficiently heavy.

What I claim as new is—

1. In a measuring apparatus, the combination of an indicator, a ratchet-wheel, a gage supported by the ratchet-wheel, a locking-rod, as $c'$, connected to the gage and resting on the ratchet-wheel, and means, as the anchor $h$ and escape-wheel $f$, for releasing said ratchet-wheel, substantially as described.

2. In a measuring apparatus, the combination of an indicator and gage, a locking-rod connected thereto, and a tube adapted to receive a coin, with a ratchet-wheel, $d$, on which the locking-rod rests, an escape-wheel, $f$, connected to the ratchet-wheel, an anchor having pallets engaging with the escape-wheel, and an arm projecting in the path of the coin traveling in the tube, substantially as described.

3. In a measuring apparatus, the combination of a treadle, B, cross-head W, and intermediate mechanism, as the racks G K, pinion H, gear J, rod L, and cord U, with a locking-rod, $c'$, and means, as the escapement $h$ and wheels $d\ f$, for holding and liberating the same, substantially as described.

4. In a measuring-machine, the combination of an escapement, a gage held normally in fixed position by said escapement, and means, as the cord U, treadle C, and connections between them, for bringing the gage into operative connection with the escapement, substantially as described.

5. In a measuring-machine, the combination, with an escapement, of a gage normally held in a stationary position by the same, and an adjustable weight acting to partly counterbalance the weight of the gage, and also governing the pressure on said escapement, substantially as described.

6. The combination, with a measuring-machine, of a channel adapted to receive a coin, an escapement having an arm projecting into the coin-channel, a cross-head carrying a gage, a pointer, and a rod coacting with said escapement, a weight, O', a cord passing over suitable pulleys and connected at one end with the cross-head and at the other to said weight O', with a rod, L, loosely connected to said weight, a treadle, and intermediate connections between the treadle and the rod, substantially as described.

7. The combination, in a measuring-machine, of a channel adapted to receive a coin, an escapement having an arm projecting into the coin-channel, a cross-head, a gage, a pointer, and a rod attached to said cross-head, said rod coacting with said escapement, a weight, O', a cord passing over suitable pulleys and connected at its opposite ends to said cross-head and weight, with a rod, L, loosely connected to said weight and carrying at its lower end a rack, K, a gear meshing with said rack, a pinion connected with said gear, a rack meshing into said pinion, a treadle connected with said rack, and a spring or weight acting to raise the treadle, all substantially as shown and described.

8. The combination of a ratchet-wheel and an escapement with a rod, $c'$, having a projection and pin, $c''$, acting on said ratchet-wheel, substantially as shown and described.

In testimony whereof I affix my signature, in presence of two witnesses, this 20th day of March, 1888.

NEWTON W. HARTWELL.

Witnesses:
JAS. H. MERSHON,
ALLEN R. WHITE.